(12) United States Patent
Turbell

(10) Patent No.: US 9,531,994 B2
(45) Date of Patent: Dec. 27, 2016

(54) MODIFYING VIDEO CALL DATA
(71) Applicant: Microsoft Technology Licensing, LLC, Redmond, WA (US)
(72) Inventor: Henrik Valdemar Turbell, Stockholm (SE)
(73) Assignee: Microsoft Technology Licensing, LLC, Redmond, WA (US)
( * ) Notice: Subject to any disclaimer, the term of this patent is extended or adjusted under 35 U.S.C. 154(b) by 1 day.
(21) Appl. No.: 14/596,076
(22) Filed: Jan. 13, 2015
(65) Prior Publication Data
US 2016/0127681 A1 May 5, 2016
(30) Foreign Application Priority Data Oct. 31, 2014 (GB) .................................. 1419438.5

(51) Int. Cl.
*H04N 7/14* (2006.01)
*H04N 1/00* (2006.01)
*H04N 7/15* (2006.01)
(52) U.S. Cl.
CPC ............ *H04N 7/141* (2013.01); *H04N 1/0035* (2013.01); *H04N 1/00352* (2013.01); *H04N 7/147* (2013.01); *H04N 7/15* (2013.01)
(58) Field of Classification Search
CPC .... G01S 5/0072; G06F 17/3028; H04L 12/18; H04L 63/102; H04L 63/105; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185
(Continued)

(56) References Cited

U.S. PATENT DOCUMENTS 5,915,091 A 6/1999 Ludwig et al.
8,331,611 B2 12/2012 Johnson et al.
(Continued)

FOREIGN PATENT DOCUMENTS

CN 102075727 5/2011
CN 102075727 A * 5/2011
(Continued)

OTHER PUBLICATIONS

"Non-Final Office Action", U.S. Appl. No. 14/602,217, Oct. 28, 2015, 9 pages.
(Continued)

*Primary Examiner* — Khai N Nguyen
(74) *Attorney, Agent, or Firm* — Tom Wong; Micky Minhas

(57) ABSTRACT

A method comprising: displaying a UI for display of received video; detecting selection of a UI displayed button while a received video frame is displayed; in response, disabling the display of video frames received after the received video frame; determining a position of a face of a user in the received frame; receiving a plurality of drawing inputs while the button is selected, each drawing input defining image data to be applied at a position on said face; modifying the video frame in accordance with the drawing inputs by applying the image data to each of the positions; detecting a condition and in response, for each video frame received after the detection, determining a position of the face in the frame to determine the location of the positions in the frame, applying the image data to each of the positions, and displaying the modified video frame in the UI.

20 Claims, 9 Drawing Sheets

(58) Field of Classification Search
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| | | | |
|---|---|---|---|
| 8,494,231 B2* | 7/2013 | Folta | G06K 9/00295 |
| | | | 382/118 |
| 8,582,834 B2* | 11/2013 | Tong | G11B 27/034 |
| | | | 382/118 |
| 8,799,827 B2 | 8/2014 | Hinckley et al. | |
| 2004/0221243 A1 | 11/2004 | Twerdahl et al. | |
| 2007/0081094 A1 | 4/2007 | Ciudad et al. | |
| 2007/0199031 A1 | 8/2007 | Nemirofsky et al. | |
| 2008/0084400 A1 | 4/2008 | Rosenberg | |
| 2008/0252722 A1* | 10/2008 | Wang | G06K 9/00771 |
| | | | 348/143 |
| 2009/0009598 A1* | 1/2009 | Sotodate | H04N 5/76 |
| | | | 348/143 |
| 2009/0183220 A1 | 7/2009 | Amento | |
| 2009/0202114 A1 | 8/2009 | Morin et al. | |
| 2009/0257623 A1 | 10/2009 | Tang et al. | |
| 2010/0070878 A1 | 3/2010 | Amento et al. | |
| 2012/0032877 A1 | 2/2012 | Watkins | |
| 2012/0051658 A1* | 3/2012 | Tong | G11B 27/034 |
| | | | 382/224 |
| 2012/0106806 A1* | 5/2012 | Folta | G06K 9/00295 |
| | | | 382/118 |
| 2012/0271711 A1 | 10/2012 | Moshiri et al. | |
| 2012/0307145 A1 | 12/2012 | Buchheit | |
| 2012/0308209 A1* | 12/2012 | Zaletel | G11B 27/034 |
| | | | 386/278 |
| 2013/0093832 A1 | 4/2013 | Konda | |
| 2013/0127992 A1* | 5/2013 | Saitoh | H04N 13/0048 |
| | | | 348/43 |
| 2013/0321648 A1 | 12/2013 | Tamiya et al. | |
| 2014/0023341 A1 | 1/2014 | Wang et al. | |
| 2014/0063174 A1* | 3/2014 | Junuzovic | G06Q 10/101 |
| | | | 348/14.02 |
| 2014/0115544 A1 | 4/2014 | Chi et al. | |
| 2014/0173530 A1 | 6/2014 | Mesguich Havilio et al. | |
| 2014/0176548 A1 | 6/2014 | Green | |
| 2014/0178047 A1 | 6/2014 | Apodaca | |
| 2014/0192140 A1 | 7/2014 | Peevers et al. | |
| 2014/0292999 A1 | 10/2014 | Do et al. | |
| 2014/0368601 A1* | 12/2014 | deCharms | H04W 4/021 |
| | | | 348/14.02 |
| 2015/0058709 A1* | 2/2015 | Zaletel | G06F 3/14 |
| | | | 715/202 |
| 2015/0172599 A1 | 6/2015 | Caldwell | |
| 2015/0350565 A1 | 12/2015 | Rapport | |
| 2016/0212370 A1 | 7/2016 | Lee et al. | |

FOREIGN PATENT DOCUMENTS

| | | |
|---|---|---|
| EP | 1424652 | 6/2004 |
| WO | WO-2015130309 | 9/2015 |

OTHER PUBLICATIONS

"CyberLink YouCam 3 User's Guide", Available at: http://download.cyberlink.com/ftpdload/user_guide/youcam/3/enu/YouCam.pdf, Jul. 4, 2010, 38 pages.

"Doodley Moore", Retrieved on: Oct. 7, 2014, Available at: https://itunes.apple.com/in/app/doodley-moore/id495619963?mt=8, 2 pages.

"Live Image Overlay Tool with support for DXF-Format CAD Files", Available at: http://www.visionxinc.com/software-systems-machines/visiongauge-online-live-image-overlay-tool.pdf, Jan. 1, 2012, 1 page.

"ManyCam 4 for Windows", Available at: http://manycam.com/user_guide/, Mar. 27, 2014, 7 pages.

"The V1 Professional Digital Coaching System Version 2010", Available at: https://www.v1sports.com/wp-content/uploads/2011/01/V1-Pro-Manual-2010.pdf, Apr. 25, 2013, 99 pages.

"Using the Capture Screen", Available at: http://www.kinovea.org/help/en/128.html, Jun. 30, 2011, 2 pages.

Kumar, "Drawing on Live Video in Flex", Available at: http://narinderkumar.wordpress.com/2012/02/16/drawing-on-live-video-in-flex/, Feb. 16, 2012, 5 pages.

Ou, et al.,' "Dove: Drawing over Video Environment", In Proceedings of the Eleventh ACM International Conference on Multimedia, Nov. 2, 2003, 2 pages.

Guimbretiere,"Stick it on the Wall: A Metaphor for Interaction with Large Displays", In Proceedings of the 28th Annual Conference on Computer Graphics, Aug. 12, 2001, 9 pages.

Herrera"Board Cam Pro—Live Exhibitions of Small Features", Available at: https://itunes.apple.com/us/app/board-cam-pro-live-exhibitions/id434217477?mt=8, Apr. 21, 2014, 2 pages.

Ou,"Gestural Communication over Video Stream: Supporting Multimodal Interaction for Remote Collaborative Physical Tasks", In Proceedings of 5th International Conference on Multimodal Interfaces, Nov. 5, 2003, 9 pages.

Owen,"Unofficial Google+ Hangout Apps Directory", Available at: http://hangoutapps.com/+/?gid=248408684568&app=Tabletop-Forge-Google-Hangout-App, Feb. 8, 2014, 1 page.

Tsang,"Boom Chameleon: Simultaneous capture of 3D viewpoint, voice and gesture annotations on a spatially-aware display", In Proceedings of the 15th Annual ACM Symposium on User Interface Software and Technology, Oct. 27, 2002, 10 pages.

Yang,"Webdove: A Web-Based Collaboration System for Physical Tasks", In Proceedings of IEEE International Conference on Multimedia and Expo, Jul. 9, 2006, 4 pages.

"Final Office Action", U.S. Appl. No. 14/602,217, Mar. 22, 2016, 8 pages.

"International Search Report and Written Opinion", Application No. PCT/US2015/057913, Jan. 27, 2016, 13 Pages.

Essa,"Tracking Facial Motion", Motion of Non-Rigid and Articulated Objects, 1994. Proceedings of the 1994 IEEE Workshop on Austin, TX, USA, Nov. 11, 1994, 7 Pages.

Lee,"Freeze-Set-Go Interaction Method for Handheld Mobile Augmented Reality Environments", Proceedings of the 16th ACM Symposium on Virtual Reality Software and Technology, Nov. 20, 2009, 4 Pages.

"International Search Report and Written Opinion", Application No. PCT/US2016/014203, Apr. 21, 2016, 12 pages.

"Non-Final Office Action", U.S. Appl. No. 14/602,217, Jul. 21, 2016, 8 pages.

"Notice of Allowance", U.S. Appl. No. 14/602,217, Aug. 19, 2016, 8 pages.

"Second Written Opinion", Application No. PCT/US2015/057913, Sep. 16, 2016, 6 pages.

"Supplemental Notice of Allowance", U.S. Appl. No. 14/602,217, Sep. 1, 2016, 5 pages.

\* cited by examiner

MODIFYING VIDEO CALL DATA

RELATED APPLICATIONS

This application claims priority under 35 USC §119 or §365 to Great Britain Patent Application No. 1419438.5, filed Oct. 31, 2014, the disclosure of which is incorporate in its entirety.

BACKGROUND

Packet-based communication systems allow the user of a device, such as a personal computer, to communicate across the computer network using a packet protocol such as Internet Protocol (IP). Packet-based communication systems can be used for various types of communication events. Communication events which can be established include voice calls, video calls, instant messaging, voice mail, file transfer and others. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

Communications systems allow users of devices to communicate across a computer network such as the internet. Communication events which can be established include voice calls, video calls, instant messaging, voice mail, file transfer and others. With video calling, the callers are able to view video images of the other party in addition to voice information. This enables a much more natural communication between the parties, as facial expressions are also communicated, thereby making video calls more comparable to a face-to-face conversation.

It is known for a communication client application to provides functionality to enable a user to modify video captured at the user's device by adding two-dimensional clip-art effects. For example a user may select to add a moustache effect, the application detects the position of a user's face in a captured frame and overlays the moustache effect at a position in the frame in dependence on the position of the user's face in the captured frame. Thus the moustache moves two-dimensionally as the user's face changes position in the captured video.

SUMMARY

Embodiments of the present disclosure relate to drawing onto displayed video frames during a video call. A drawing drawn by a user is mapped onto points of a user's face in the video frames so that the drawing moves with the user's face three-dimensionally.

The inventors have recognised that as this drawing is input freehand by a user it is difficult to accurately draw on the displayed video frames, especially when the face of the user in the video frames is moving. This problem is exacerbated when a user is drawing on another user's face i.e. has no control of the amount of movement of the face in the displayed video frames.

According to first aspect of the present disclosure there is provided a method implemented at a user terminal during a video call conducted with at least one further user terminal over a communications network, the method comprising: displaying a user interface on a display of the user terminal for display of received video frames; detecting selection of a selectable button displayed in said user interface by a user using an input device of said user terminal whilst a received video frame is displayed in the user interface; in response to said detection, disabling the display of video frames received after said received video frame; determining a position of a face of a user in the received video frame by executing a face tracker algorithm on a processor of said user terminal; receiving a plurality of drawing inputs whilst the selectable button is in a selected state, each drawing input defining image data to be applied at a facial position on said face; modifying the displayed video frame in accordance with the plurality of received drawing inputs by applying the image data to each of said facial positions on the face; detecting a condition and in response to detecting said condition, for each video frame received after detecting said condition, the method further comprises: determining a position of the face in the video frame by executing the face tracker algorithm to determine the location of the facial positions in the video frame, modifying the video frame by applying the image data to each of said positions on the face, and displaying the modified video frame in the user interface.

According to another aspect of the present disclosure there is provided a user terminal comprising: a display; an input device; a network interface configured to transmit and receive video data between the user terminal and a communication network during a video call between the user terminal and at least one further user terminal; a processor configured to run an application operable during said video call to: display a user interface on the display for display of received video frames; detect selection of a selectable button displayed in said user interface by a user using said input device whilst a received video frame is displayed in the user interface; in response to said detection, disable the display of video frames received after said received video frame; determine a position of a face of a user in the received video frame by executing a face tracker algorithm; receive a plurality of drawing inputs whilst the selectable button is in a selected state, each drawing input defining image data to be applied at a facial position on said face; modify the displayed video frame in accordance with the plurality of received drawing inputs by applying the image data to each of said facial positions on the face; detect a condition and in response to said condition detection, for each video frame received after said condition detection, determine a position of the face in the video frame by executing the face tracker algorithm to determine the location of the facial positions in the video frame, modify the video frame by applying the image data to each of said positions on the face, and display the modified video frame in the user interface.

According to another aspect of the present disclosure there is provided a computer program product, the computer program product being embodied on a computer-readable medium and configured so as when executed on a processor of a user terminal during a video call between the user terminal and at least one further user terminal, to perform any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Embodiments of the present disclosure are described by way of example only.

Figure 1:
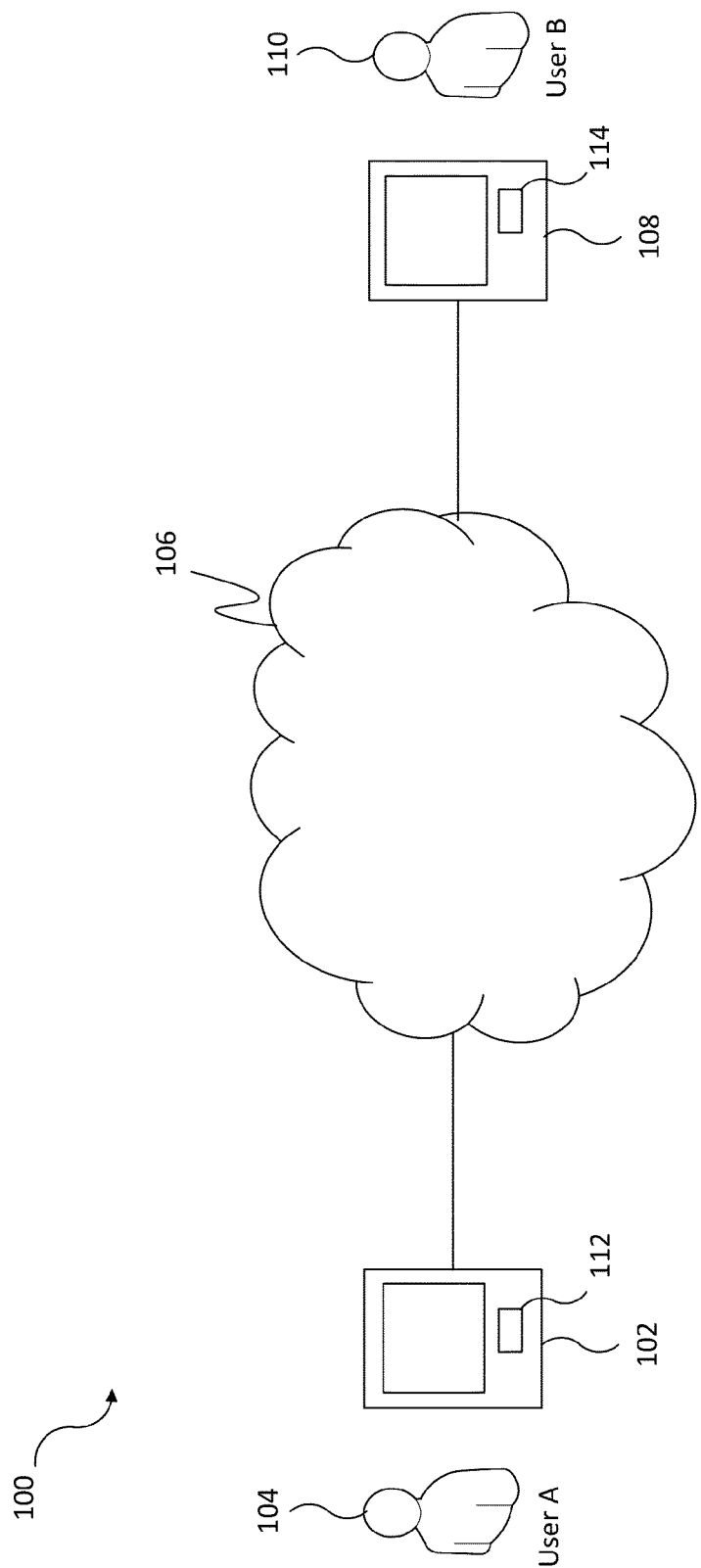
FIG. 1 shows a communication system.

FIG. 1 shows a communication system 100 comprising a first user 104 (User A) who is associated with a user terminal 102 and a second user 110 (User B) who is associated with a user terminal 108. The user terminals 102 and 108 can communicate over a communication network 106 in the communication system 100, thereby allowing the users 104 and 110 to communicate with each other over the communication network 106. The communication network 106 may be any suitable network which has the ability to provide a communication channel between the user terminal 102 and the second user terminal 108. For example, the communication network 106 may be the Internet or another type of network such as a High data rate mobile network, such as a $3^{rd}$ generation ("3G") mobile network.

Note that in alternative embodiments, user terminals can connect to the communication network 106 via an additional intermediate network not shown in FIG. 1. For example, if the user terminal 102 is a mobile device, then it can connect to the communication network 106 via a cellular mobile network (not shown in FIG. 1), for example a GSM or UMTS network.

The user terminal 102 may be, for example, a mobile phone, a personal digital assistant ("PDA"), a personal computer ("PC") (including, for example, Windows™, Mac OS™ and Linux™ PCs), a tablet computer, a gaming device or other embedded device able to connect to the communication network 106. The user terminal 102 is arranged to receive information from and output information to User A 104.

The user terminal 102 executes a communication client application 112, provided by a software provider associated with the communication system 100. The communication client application 112 is a software program executed on a local processor in the user terminal 102. The communication client application 112 performs the processing required at the user terminal 102 in order for the user terminal 102 to transmit and receive data over the communication system 100. The communication client application 112 executed at the user terminal 102 may be authenticated to communicate over the communication system through the presentation of digital certificates (e.g. to prove that user 104 is a genuine subscriber of the communication system—described in more detail in WO 2005/009019).

The user terminal 108 may correspond to the user terminal 102. The user terminal 108 executes, on a local processor, a communication client application 114 which corresponds to the communication client application 112 executed at the user terminal 102. The communication client application 114 at the user terminal 108 performs the processing required to allow User 110 to communicate over the network 106 in the same way that the communication client application 112 at the user terminal 102 performs the processing required to allow the User A 104 to communicate over the network 106. The user terminals 102 and 108 are end points in the communication system. FIG. 1 shows only two users (104 and 110) and two user terminals (102 and 108) for clarity, but many more users and user devices may be included in the communication system 100, and may communicate over the communication system 100 using respective communication clients executed on the respective user devices, as is known in the art.

Figure 2:
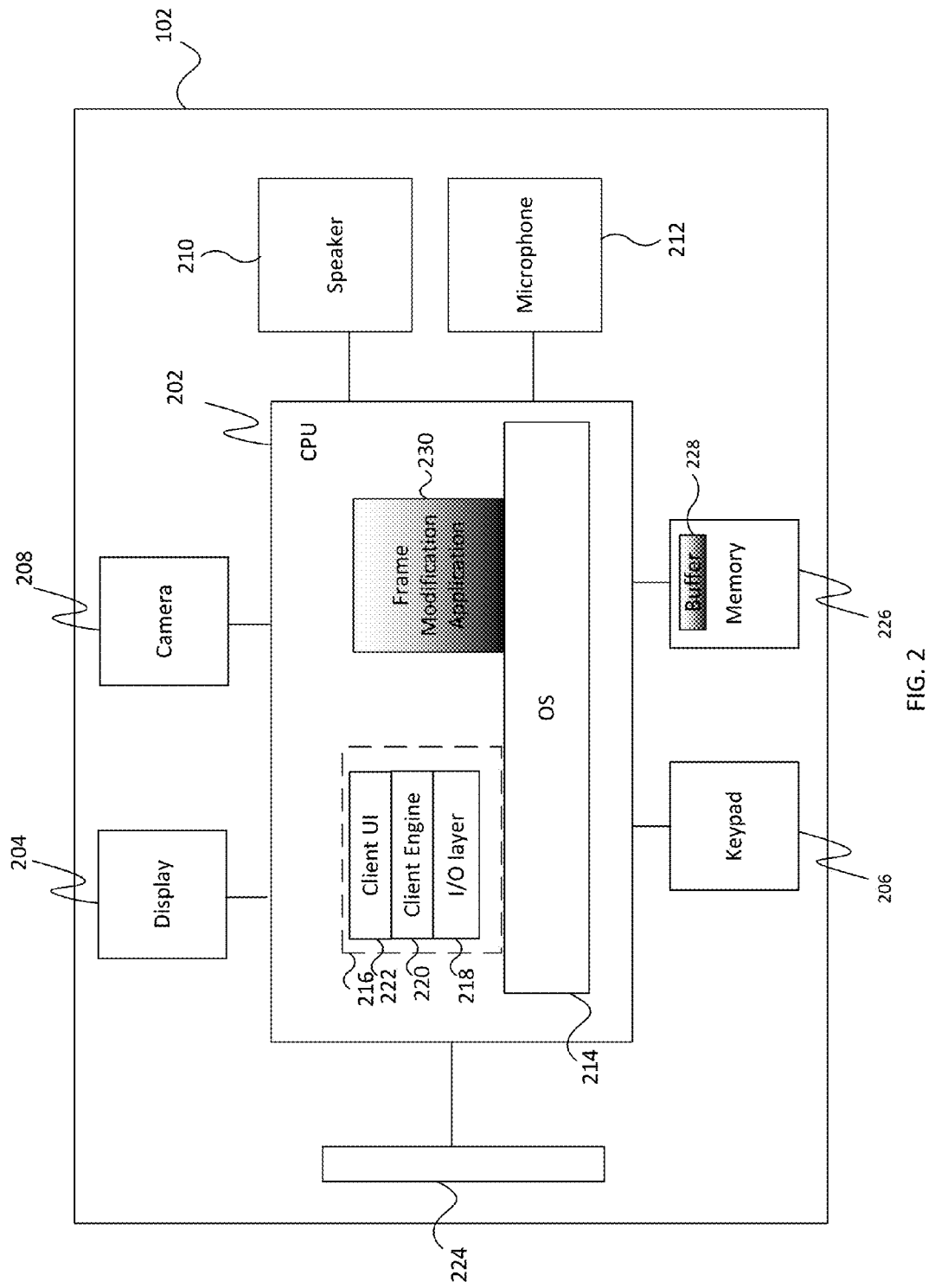
FIG. 2 shows a schematic view of a user terminal.

FIG. 2 illustrates a detailed view of the user terminal 102 on which is executed a communication client application for communicating over the communication system 100. The user terminal 102 comprises a central processing unit ("CPU") 202, to which is connected a display 204 such as a screen or touch screen, input devices such as a keypad 206, a camera 208, and touch screen 204. In embodiments described below the camera 208 may be a conventional webcam that is integrated into the user terminal 102, or coupled to the user device via a wired or wireless connection. Alternatively, the camera 208 may be a depth-aware camera such as a time of flight or structured light camera. An output audio device 210 (e.g. a speaker) and an input audio device 212 (e.g. a microphone) are connected to the CPU 202. The display 204, keypad 206, camera 208, output audio device 210 and input audio device 212 may be integrated into the user terminal 102 as shown in FIG. 2. In alternative user terminals one or more of the display 204, the keypad 206, the camera 208, the output audio device 210 and the input audio device 212 may not be integrated into the user terminal 102 and may be connected to the CPU 202 via respective interfaces. One example of such an interface is a USB interface. The CPU 202 is connected to a network interface 224 such as a modem for communication with the communication network 106. The network interface 224 may be integrated into the user terminal 102 as shown in FIG. 2. In alternative user terminals the network interface 224 is not integrated into the user terminal 102. The user terminal 102 also comprises a memory 226 for storing data as is known in the art. The memory 226 may be a permanent memory, such as ROM. The memory 226 may alternatively be a temporary memory, such as RAM.

The user terminal 102 is installed with the communication client application 112, in that the communication client application 112 is stored in the memory 226 and arranged for execution on the CPU 202. FIG. 2 also illustrates an operating system ("OS") 214 executed on the CPU 202. Running on top of the OS 214 is a software stack 216 for the communication client application 112 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine 220 also communicates with the client user interface layer 222. The client engine 220 may be arranged to control the client user interface layer 222 to present information to the user of the user terminal 102 via the user interface of the communication client application 112 which is displayed on the display 204 and to receive information from the user of the user terminal 102 via the user interface.

Also running on top of the OS 214 is a frame modification application 230. Embodiments are described below with reference to the frame modification application 230 and communication client application 112 being separate applications, however the functionality of the frame modification application 230 described in more detail below can be incorporated into the communication client application 112.

Figure 3:
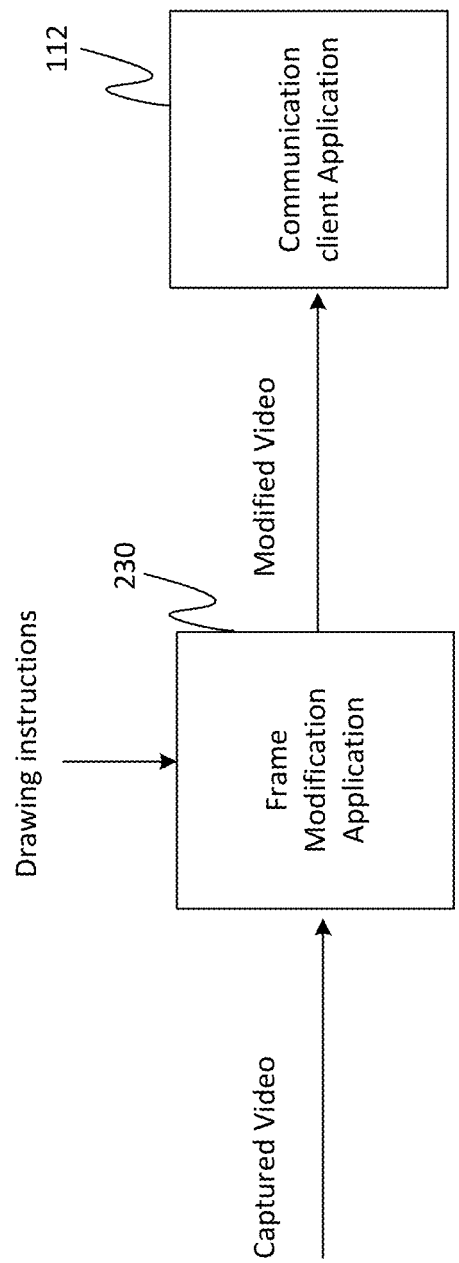
FIG. 3 illustrates communication between a frame modification application and a communication client application executed on the user terminal.

FIG. 3 illustrates how the frame modification application 230 interacts with the communication client application 112.

As shown in FIG. 3, the frame modification application 230 is arranged to receive captured video and drawing instructions. The frame modification application 230 is arranged to modify captured video frames in dependence on drawing instructions and supply modified video frames to the communication client application 112.

In embodiments described below the frame modification application 230 receives the captured video frames from the camera 208 and the frame modification application 230 receives drawing instructions from user A 104. Video frames that have been modified in response to the drawing instructions received from user A 104 are supplied from the frame modification application 230 to the communication client application 112 for transmission over the network 106 to user terminal 108.

The frame modification application 230 presents information to User A 104 via a user interface which is displayed on the display 204.

Figure 4:
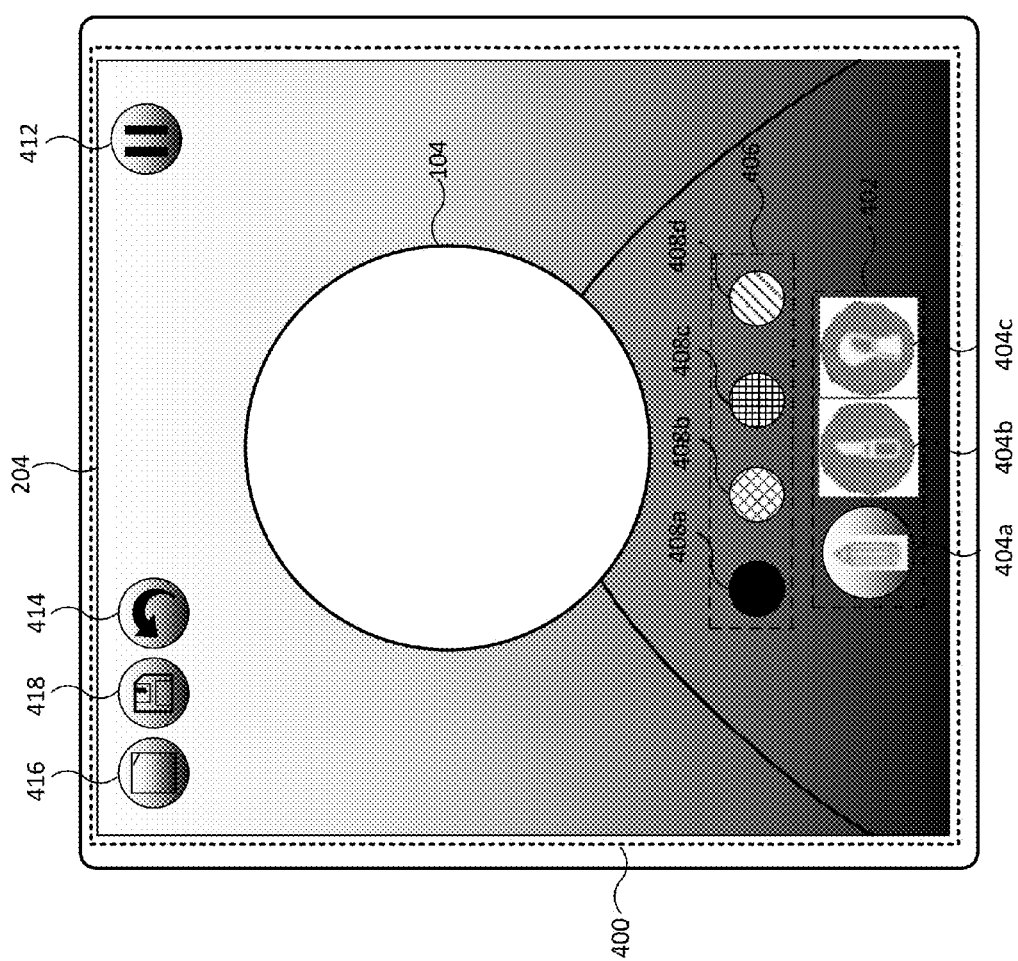
FIG. 4 illustrates a user interface provided by the frame modification application.

FIG. 4 illustrates the frame modification application 230 displaying content in an available area 400 of the display 204. Whilst the available area of the display is the whole of the display in FIG. 4, the available area of the display (that is the area available to the frame modification application 230) may constitute only a portion of the display e.g. with the remainder of the display being used by the operating system and/or other application(s) executed thereon to display other content.

As shown in FIG. 4, the user interface provided by the frame modification application 230 displays video data captured by the camera 208 (in FIG. 4, User A 104 is looking into the camera 208).

As shown in FIG. 4, the frame modification application 230 may overlay at least one selectable drawing tool button 402 over the displayed captured video for User A 104 to select using an appropriate input device (e.g. a mouse, a stylus pen interacting with a touch screen, or touching a touch screen directly). The selectable drawing tool buttons 402 may comprise a pen drawing tool button 404a, a lipstick drawing tool button 404b, and a brush drawing tool button 404c. In response to detecting selection of one of the selectable drawing tool buttons 402 the frame modification application 230 is arranged to overlay a palette of colours 406 over the displayed captured video. The palette of colours 406 that is overlaid over the displayed captured video is associated with the selected drawing tool button.

Each palette of colours 406 comprises at least one selectable colour for User A 104 to select using an appropriate input device. FIG. 4 illustrates a palette of colours 406 comprising a first colour 408a, a second colour 408b, a third colour 408c, and a fourth colour 408d.

The selection of a drawing tool button 404 and a colour 408 enables User A 104 to draw on the captured video data that is displayed in the user interface provided by the frame modification application 230. The frame modification application 230 includes three-dimensional face tracker functionality which identifies a plurality of points of a user's face in the captured video data and tracks these points as the user moves. In accordance with embodiments described in more detail below, a drawing drawn by User A 104 onto User A's face in the displayed captured video is mapped onto points of the user's face identified by the face tracker so that the drawing moves with the user's face three-dimensionally.

The frame modification application 230 may overlay a selectable frame rendering adjustment button 412 over the displayed captured video for User A 104 to select using an appropriate input device. In response to detecting selection of the selectable frame rendering adjustment button 412, the frame modification application 230 adjusts the way in which received video frames are rendered in the user interface provided by the frame modification application 230.

The memory 226 comprises a data buffer 228 for storing received video frames prior to being rendered in the user interface provided by the frame modification application 230.

In a first embodiment, if the frame modification application 230 detects selection of the selectable frame rendering adjustment button 412 (the selectable frame rendering adjustment button 412 is then in a selected state) whilst a received video frame is displayed in the user interface provided by the frame modification application 230 the frame modification application 230 prevents any video frames in the data buffer 228 being read from the data buffer 228 and rendered in the user interface provided by the frame modification application 230, until the selectable frame rendering adjustment button 412 is selected again. Thus the selectable frame rendering adjustment button 412 acts to pause the incoming live video data.

In response to detecting selection of the selectable frame rendering adjustment button 412 by User A 104 again (the selectable frame rendering adjustment button 412 is then in an unselected state), the frame modification application 230 renders the first video frame that was received in the data buffer 228 after the selectable frame rendering adjustment button 412 was selected again, and continues reading later received video frames from the data buffer 228 for rendering in the user interface provided by the frame modification application 230.

It will be appreciated that during a time period between selection of the selectable frame rendering adjustment button 412 for the first time, and selection of the selectable frame rendering adjustment button 412 for the second time, video frames are still received by the frame modification application 230 and stored in the data buffer 228.

In a second embodiment, if the frame modification application 230 detects selection of the selectable frame rendering adjustment button 412 (the selectable frame rendering adjustment button 412 is then in a selected state) whilst a received video frame is displayed in the user interface provided by the frame modification application 230 the frame modification application 230 prevents any video frames in the data buffer 228 being read from the data buffer 228 and rendered in the user interface provided by the frame modification application 230, until a predetermined period of time has elapsed. Thus the selectable frame rendering adjustment button 412 acts to slow down the rendering of the incoming live video data.

In response to detecting that the predetermined period of time since selection of the selectable frame rendering adjustment button 412 has elapsed (the selectable frame rendering adjustment button 412 is then in an unselected state), the frame modification application 230 renders the first video frame that was received in the data buffer 228 after the expiry of the predetermined period of time since selection of the selectable frame rendering adjustment button 412, and continues reading later received video frames from the data buffer 228 for rendering in the user interface provided by the frame modification application 230.

It will be appreciated that during a time period between selection of the selectable frame rendering adjustment button 412, and the predetermined period of time expiring, video frames are still received by the frame modification application 230 and stored in the data buffer 228.

The operation of the frame modification application 230 in response to detecting selection of the frame rendering adjustment button 412 will be described in further detail with reference to FIGS. 5a and 5b.

Figure 5A:
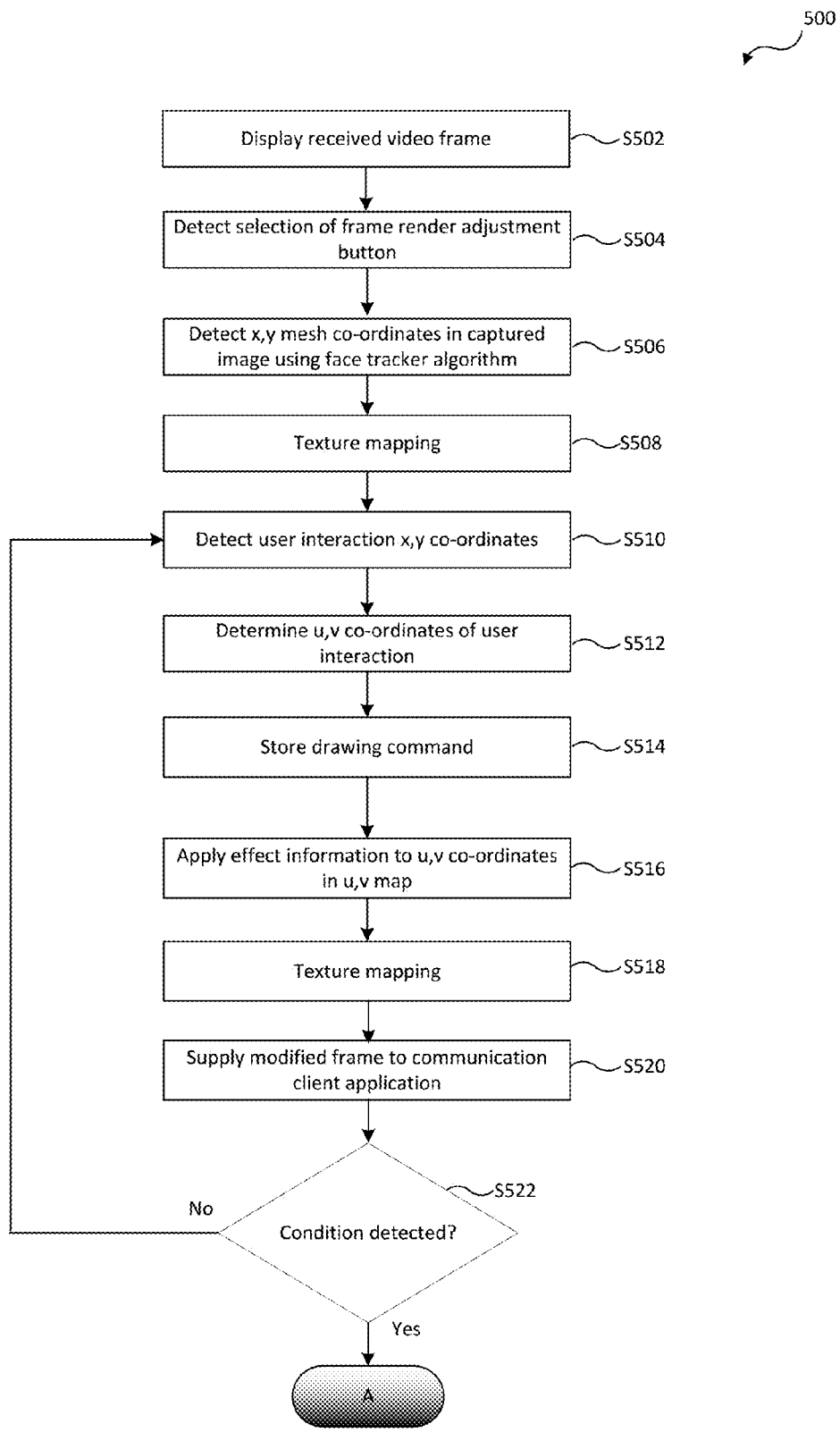
FIGS. 5a and 5b illustrates a flow chart for a process of modifying video data.

Reference is first made to FIG. 5a, which shows a flow chart 500 of a method performed frame modification application 230 whilst a video call is being conducted between the first user terminal 102 and the second user terminal 108.

The process starts at step S502, whereby the frame modification application 230 displays a received video frame in the user interface provided by the frame modification application 230. In the exemplary embodiment, the frame modification application 230 receives captured video frames from the camera 208 of the first user terminal 102.

At step S504, the frame modification application 230 detects selection of the selectable frame rendering adjustment button 412 by User A 104.

Figure 6:
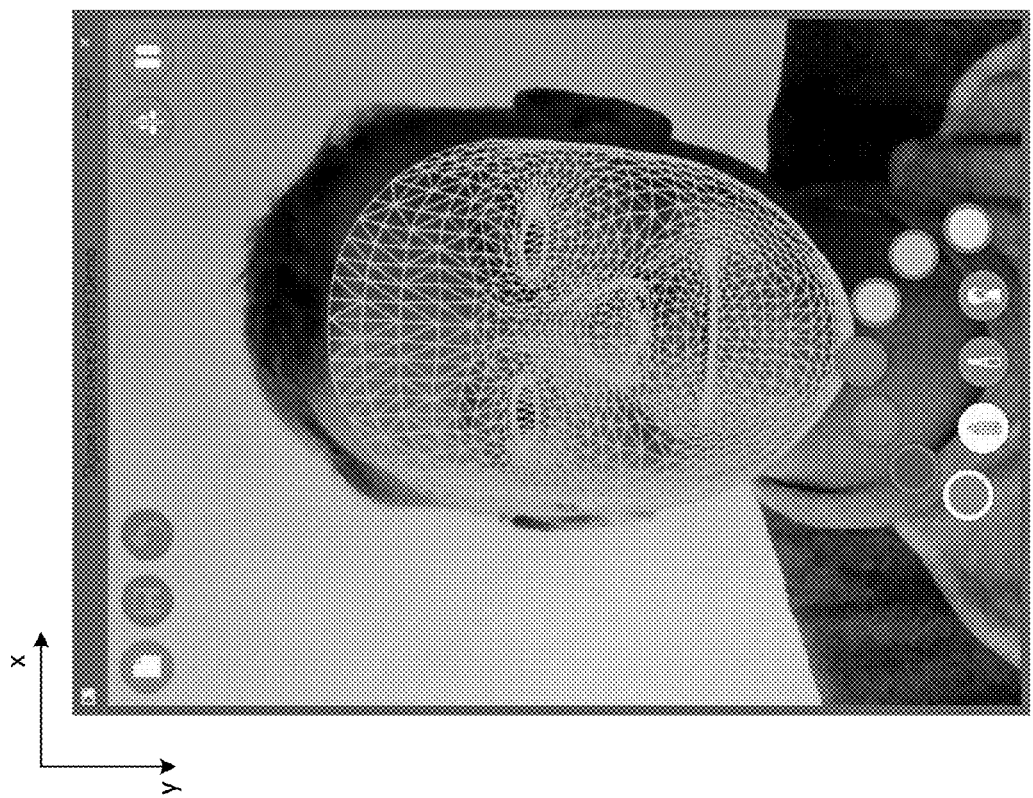
FIG. 6 illustrates a three-dimensional triangulated mesh identifying points of a face in a captured video frame.

At step S506, the frame modification application 230 detects a position of a face of a user in the received video frame. The frame modification application 230 may perform step S506 by executing a face tracker algorithm. This face tracker algorithm may be based on the known active appearance model (AAM) approach. The face tracker algorithm tracks facial feature points in two-dimensions and fits a three-dimensional triangulated mesh to the tracked facial feature points. The face tracker algorithm determines three-dimensional pixel co-ordinates (x,y,z) of each vertex of the three-dimensional triangulated mesh that is fitted to the user's face. The three-dimensional triangulated mesh comprises a plurality of vertices which define a plurality of triangles. An example three-dimensional triangulated mesh fitted to a user's face (captured in a video frame) is illustrated in FIG. 6. The co-ordinates of each vertex of the three-dimensional triangulated mesh define the position of the vertex in the frame, this may be defined in terms of pixel number. As described above, the camera 208 may be a conventional or a depth-aware camera. When the camera 208 is a depth-aware camera the depth information output by the depth-aware camera is used as an additional input to the face tracker algorithm, but the output of the face tracker algorithm is the same regardless as to whether the camera 208 is a conventional or a depth-aware camera.

Figure 7:
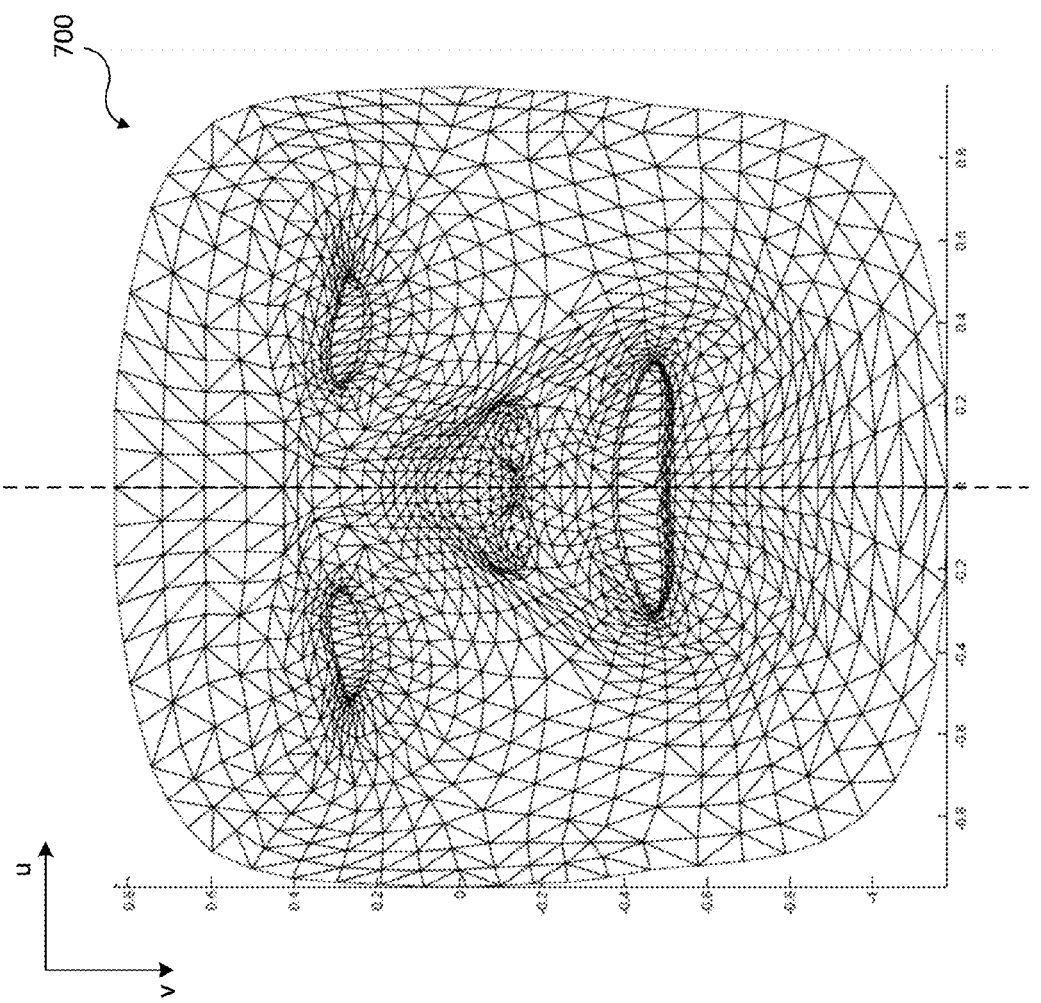
FIG. 7 illustrates a two dimensional texture map.

The frame modification application 230 is configured to compute a two dimensional representation of the three-dimensional triangulated mesh. This is referred to herein as a two-dimensional texture map 700 which is illustrated in FIG. 7.

The various possible techniques to compute a two dimensional representation of the three-dimensional triangulated mesh are well known to persons skilled in the art and are therefore not discussed in detail herein. One example method comprises (i) projecting the three-dimensional triangulated mesh onto an ellipsoid; and (ii) projecting the ellipsoid into two-dimensions (for example using the Gall-Peters equal area map projection).

The two-dimensional texture map 700 is overlaid on a pixel grid that is a number of pixels wide and that is a number of pixels high. This pixel width and pixel height define the resolution of the pixel grid. The resolution of the pixel grid may for example be 512×512. UV coordinates (expressed as pixel co-ordinates of the pixel grid) are used to describe the surface of the two-dimensional texture map 700. Each u,v co-ordinate in the two-dimensional texture map 700 has a corresponding x,y pixel co-ordinate in the video frame. The pixel resolution of the pixel grid is quite arbitrary. If the pixel resolution is too small, the texture mapping (described below with reference to step S522) will introduce smoothing/blurring in the modified image. If the pixel resolution is too large, the texture mapping and effect rendering will by unnecessarily slow. Therefore it will be apparent to persons skilled in the art will appreciate that is appropriate to select a pixel resolution of the pixel grid that approximately corresponds to the maximum size of a face in the received image. The u,v co-ordinates of the face mesh are constant and invariant to the face position, expression or pose. The u,v co-ordinates are computed once in an offline pre-computation step before the process 500 starts.

At step S508, the frame modification application 230 performs a texture mapping process whereby the texture of each triangle of the three-dimensional triangulated mesh computed at step S506 is copied to the corresponding triangle in the two-dimensional texture map 700. Reference to the "texture" of a triangle in the three-dimensional triangulated mesh is used herein to refer to the colour values of each pixel in the particular triangle in the three-dimensional triangulated mesh. A pixel colour value may be defined in accordance with the RGB colour model.

At step S510, the frame modification application 230 detects that a drawing instruction (otherwise referred to herein as a drawing input) has been received from User A 104, the drawing instruction defines a modification to be applied to the video frame received at step S502. The frame modification application 230 receives a drawing instruction in response to User A 104 drawing in the area of the user interface provided by the frame modification application 230 in which received video frames are displayed having selected a drawing tool button 404 and a colour 408. A drawing instruction defines image data (e.g. a drawing effect) to be applied at position on the face of a user in the received video frame. At step S510, the frame modification application 230 determines a set of pixel co-ordinates (x,y) of the drawing made by User A 104.

At step S512, the frame modification application 230 determines the u,v co-ordinates that correspond to the co-ordinates (x,y) of the drawing instruction detected at step S510. At step S514 the frame modification application 230 stores a drawing command, in the form of the u,v co-ordinates (determined at step S510) with associated effect information, in memory 226. The effect information that is associated with u,v co-ordinates comprise an indication of the drawing modification to be applied to the two-dimensional texture map 700 at the u,v co-ordinates, based on the drawing tool button 404 and colour 408 selected by User A 104. In some embodiments, the effect information does not comprise an absolute colour value. Instead, the effect information comprises a colour modification factor in dependence on the colour 408 selected. The colour modification factor is defined in terms of a multiplicative term and an additive term. So a pixel with an original colour value (R, G, B) is modified to have a new colour value (R', G', B') according to the following:

$$R'=\alpha_R R+\beta_R$$

$$G'=\alpha_G G+\beta_G$$

$$B'=\alpha_B B+\beta_B$$

Whereby, the three multiplicative terms $\alpha_R$, $\alpha_G$ and $\alpha_B$ and the three additive terms $\beta_R$, $\beta_G$, and $\beta_B$ describe the effect to be applied. The values of the three multiplicative terms and the three additive terms are preconfigured and vary in dependence on the colour 408 that is selected. By applying a colour modification factor in this way, pixels are modified in a manner that is in keeping with unmodified pixels in the video frame. For example if light levels in a room where the camera 208 is capturing video change, the colour modification factor ensures that pixels are modified based on their original colour value. Embodiments also extend to a colour 408 defining an absolute colour value. The stored effect information also comprises information on the width of the drawing stroke, which gives an indication on the number of pixels surrounding the pixel at the u,v co-ordinates that are to be modified. The width of the drawing stroke is dependent on the drawing tool button 404 that is selected. For example, the width of a drawing stroke made when the brush drawing tool button 404c is selected may be wider than a drawing stroke made when the lipstick drawing tool button 404b is selected. Similarly, the width of a drawing stroke made when the lipstick drawing tool button 404b is selected may be wider than a drawing stroke made when the pen drawing tool button 404a is selected.

At step S516, the frame modification application 230 modifies the two-dimensional texture map 700 in accordance with the drawing command stored at step S514. That is, for the u,v co-ordinates determined at step S512, the frame modification application 230 modifies the u,v co-ordinate of the two-dimensional texture map 700 in accordance with its associated effect information.

At step S518, the frame modification application 230 performs a texture mapping process that is the reverse to the texture mapping performed at step S508. At step S518, the texture of each triangle in the two-dimensional texture map 700 is copied to the corresponding triangle of the three-dimensional triangulated mesh determined at step S506. Reference to the "texture" of a triangle in the two-dimensional texture map 700 is used herein to refer to the colour values of each pixel in the particular triangle in the two-dimensional texture map 700.

In response to step S518 being performed by the frame modification application 230 a modification to the video frame displayed at step S502 is rendered in the user interface provided by the frame modification application 230.

Step S518 may be implemented using z-buffering. If a portion of a triangle of the three-dimensional triangulated mesh must be rendered in the same x,y pixel of the video frame as a portion of another triangle of the three-dimensional triangulated mesh, the depths (z coordinate) of these portions are compared and the x,y pixel of the video frame gets its colour from the triangle closest to the viewer (e.g. User A) of the display 204 of the user terminal 102. Performing step S518 using z-buffering, ensures that x,y pixels that belong to more than one triangle of the three-dimensional triangulated mesh get their colour from the triangle closest to the viewer (e.g. User A) i.e. the triangle(s) further away are occluded by the closest one.

An alternative to the z-buffering technique is to determine a depth (z coordinate) value at the mid-point of each triangle of the three-dimensional triangulated mesh, and sort all of the triangles of the three-dimensional triangulated mesh into a sorted list according to their mid-point z-value. By starting the rendering with the triangle of the three-dimensional triangulated mesh that is furthest away from the viewer of the display 204, and working through the sorted list finishing with the rendering of the triangle of the three-dimensional triangulated mesh that is closest away from the viewer of the display 204, this will also handle the occlusion correctly.

At step S520, the frame modification application 230 supplies the modified video frame to the communication client application 112 for transmission via the network interface 224 to the second user terminal 108 over the network 106. It will be appreciated by persons skilled in the art that the modified video frame may be processed by the communication client application 112 (e.g. encoded and packetized) prior to transmission. It will be appreciated that in embodiments whereby the functionality of the frame modification application 230 is incorporated into the communication client application 112, at step S518 the communication renders the modified video frame in the user interface provided by the communication client application 112, and step S520 is not performed.

At step S522, the frame modification application 230 determines whether a condition is detected. In the first embodiment, the condition corresponds to the selectable frame rendering adjustment button 412 being selected again (after being selected at step S504) i.e. the selectable frame rendering adjustment button 412 being in an unselected state). In the second embodiment, the condition corresponds to the predetermined period of time since selection of the selectable frame rendering adjustment button 412 at step S504 having elapsed.

If the frame modification application 230 determines at step S522 that the condition has not been detected, the process 500 proceeds back to step S510. During the process 500 looping between steps S510-S522, User A 104 is able to draw on a user's face in the single video frame that is displayed at step S502. This enables User A 104 to draw accurately on the face in the video frame in contrast to when the face is moving when received video frames are continuously read from the data buffer for rendering in the user interface provided by the frame modification application 230.

Figure 5B:
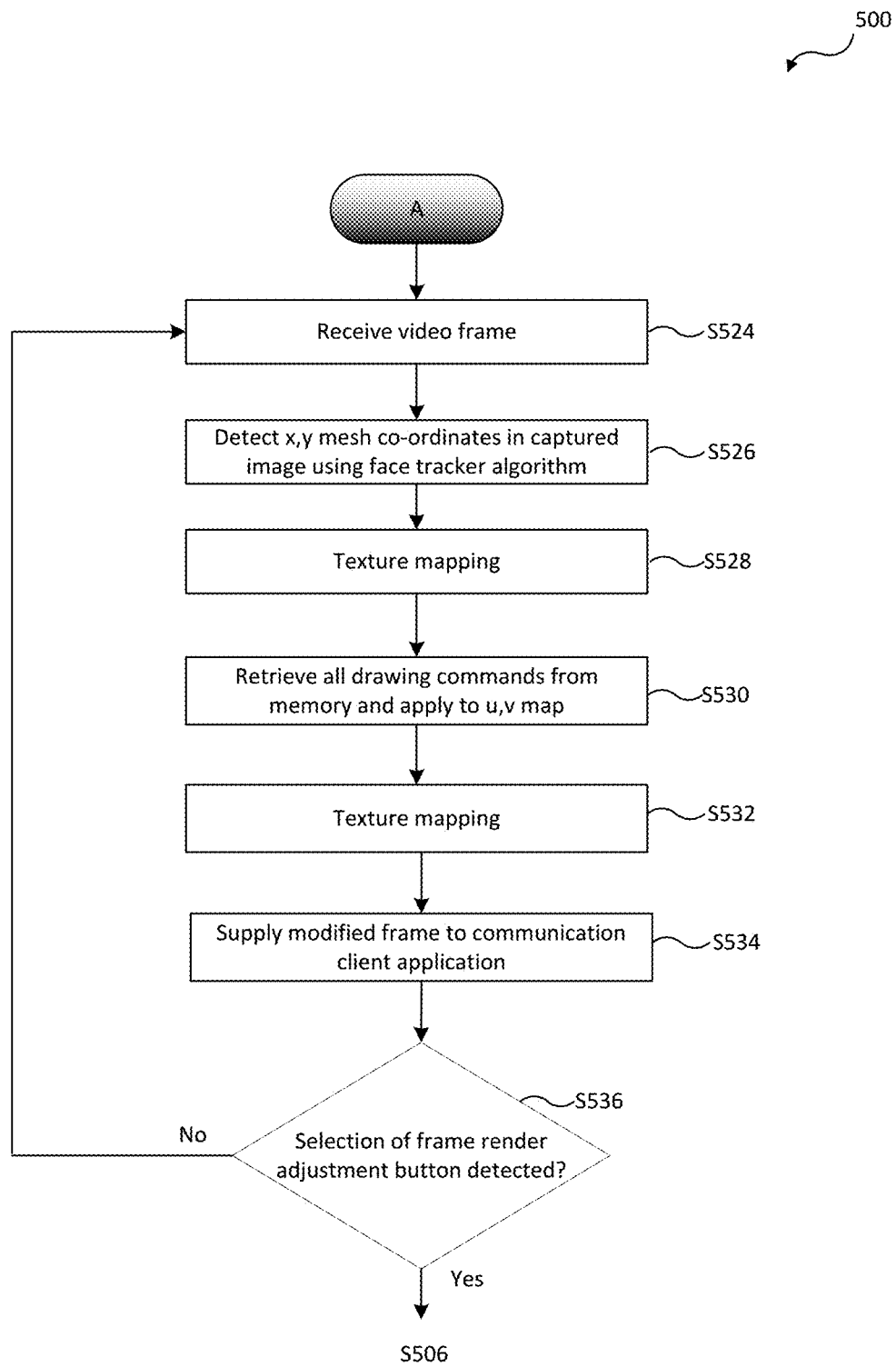

If the frame modification application 230 determines at step S522 that the condition has been detected, the process 500 proceeds to step S524 shown in FIG. 5b.

At step S524 the frame modification application 230 receives a video frame from the data buffer.

In the first embodiment, the video frame received at step S524 corresponds to the first video frame that was received in the data buffer after the selectable frame rendering adjustment button 412 was selected to be in an unselected state. In the second embodiment, the video frame received at step S524 corresponds to the first video frame that was received in the data buffer after the expiry of the predetermined period of time since detecting selection of the selectable frame rendering adjustment button 412 at step S504.

At step S526, the frame modification application 230 detects a position of a face of a user in the video frame received at step S522. This process has been described above with reference to step S506 therefore is not repeated for clarity purposes.

At step S528, the frame modification application 230 performs a texture mapping process whereby the texture of each triangle of the three-dimensional triangulated mesh computed at step S526 is copied to the corresponding triangle in the two-dimensional texture map 700.

At step S530, all of the drawing commands that have been stored in memory 226 in response to step S514 being performed each time the process 500 looped through steps S510-S522 are retrieved by the frame modification application 230 and are used to modify the two-dimensional texture map 700. That is, for each of the retrieved u,v co-ordinates, the frame modification application 230 modifies the u,v co-ordinate of the two-dimensional texture map 700 in accordance with effect information associated with the u,v co-ordinates.

At step S532, the frame modification application 230 performs a texture mapping process that is the reverse to the texture mapping performed at step S528. This process has been described above with reference to step S518 therefore is not repeated for clarity purposes.

In response to step S532 being performed by the frame modification application 230 the video frame received at step S524 is displayed in modified form in the user interface provided by the frame modification application 230.

At step S534, the frame modification application 230 supplies the modified video frame to the communication client application 112 for transmission via the network interface 224 to the second user terminal 108 over the network 106. It will be appreciated that in embodiments whereby the functionality of the frame modification application 230 is incorporated into the communication client application 112, at step S532 the communication renders the modified video frame in the user interface provided by the communication client application 112, and step S534 is not performed.

The process 500 then proceeds to step S536 where the frame modification application 230 determines whether the selectable frame rendering adjustment button 412 has been selected. If at step S536, the frame modification application 230 determines that the selectable frame rendering adjustment button 412 has been selected, the process 500 returns to S524 where the frame modification application 230 receives the next video frame from the data buffer and the loops of steps S524-S536 is repeated.

That is, all of the drawings made to the video frame displayed at step S502 whilst the selectable frame rendering adjustment button 412 was in the selected state are applied to all video frames that are received in the data buffer whilst the selectable frame rendering adjustment button 412 is in the unselected state. A drawing drawn by User A 104 onto User A's face in a video is mapped onto points of the user's face identified by the face tracker so that the drawing moves with the user's face three-dimensionally.

If at step S536, the frame modification application 230 determines that the selectable frame rendering adjustment button 412 has been selected, the process 500 proceeds to step S506.

In the embodiment described above, any modified frame that is displayed in the user interface provided by the frame modification application 230 on the display 204 is transmitted by the communication client application 112 to the second user terminal 108. Thus User B 110 sees what User A 104 sees. It will be appreciated that during a time period between selection of the selectable frame rendering adjustment button 412 at step S504 and the condition being detected at step S522 video frames received by the frame modification application 230 and stored in the data buffer 228 are not transmitted to the second user terminal 108, and may be discarded from the data buffer 228. In this time period the received video frame displayed at step S502 is transmitted to the to the second user terminal 108 in modified form.

In an alternative embodiment, during the time period between selection of the selectable frame rendering adjustment button 412 at step S504 and the condition being detected at step S522 video frames received by the frame modification application 230 and stored in the data buffer 228 are transmitted to the second user terminal 108. That is, live captured video is sent to the second user terminal whilst the selectable frame rendering adjustment button 412 is in the selected state. Furthermore drawing modification information is sent to the second user terminal each time it is determined. This drawing modification information may be in the form of the pixel co-ordinates (x,y) determined at step S510, or the u,v co-ordinates determined at step S512. This allows a frame modification application executed on the second user terminal to modify the received video frames in accordance with the received drawing modification information.

In a further alternative embodiment, during the time period between selection of the selectable frame rendering adjustment button 412 at step S504 and the condition being detected at step S522 video frames received by the frame modification application 230 and stored in the data buffer 228 are transmitted to the second user terminal 108. That is, live captured video is sent to the second user terminal whilst the selectable frame rendering adjustment button 412 is in the selected state. In this further alternative embodiment, drawing modification information is sent to the second user terminal once the condition has been detected at step S522. This drawing modification information may be in the form of a plurality of pixel co-ordinates (x,y) that were determined each time step S510 was performed, or a plurality of u,v co-ordinates that were determined each time step S512 was performed. This allows a frame modification application executed on the second user terminal to modify video frames received after receipt of the drawing modification information in accordance with the received drawing modification information.

The two-dimensional texture map 700 has to be re-rendered for each video frame (at step S508 and S526) since it must contain fresh up-to-date texture from the captured image (in the video frame). The drawing effects, on the other hand, may be pre-rendered into a separate UV map (termed an "effect map" herein). This "effect map" stays constant until the user adds or removes a drawing stroke. The effect map is blended onto the two-dimensional texture map 700 to create a blended two-dimensional representation of the three-dimensional triangulated mesh. By setting the resolution of the effect map equal to that of the two-dimensional texture map 700, this blending can done in a trivial pixel-by-pixel loop, without any need of knowledge of the three-dimensional triangulated mesh, or occlusions. Each of the u,v co-ordinates of the blended two-dimensional representation of the three-dimensional triangulated mesh take the texture from the corresponding u,v co-ordinate of the two-dimensional texture map 700 unless the effect map has been modified at the particular u,v co-ordinates, in which case the u,v co-ordinates of the blended two-dimensional representation of the three-dimensional triangulated mesh take the texture from the effect map.

Figure 8:
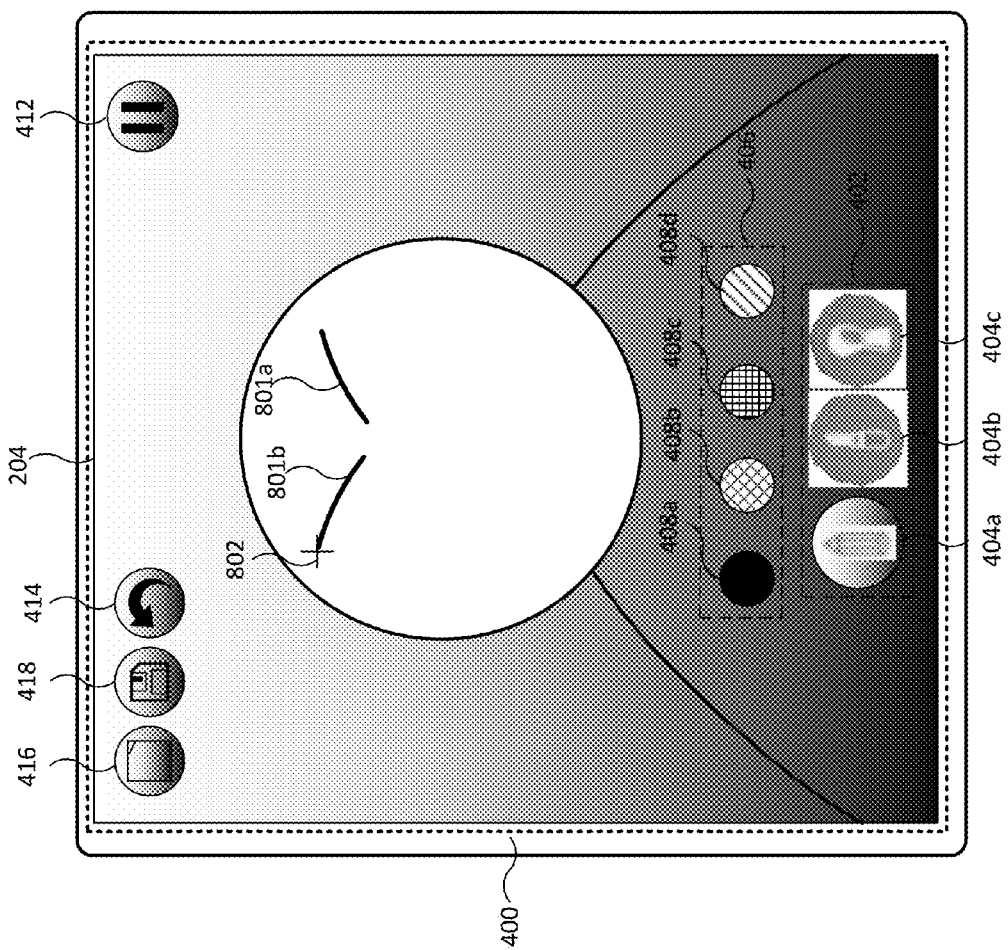
FIG. 8 illustrates application of drawings to a received video frame by the frame modification application.

FIG. 8 illustrates the user interface provided by the frame modification application 230 following User A 104 drawing brushstrokes 801a and 801b by moving a cursor 802 whilst the selectable frame rendering adjustment button 412 is in the selected state.

The drawings 801a and 801b stick to the skin of the face in the captured video data whilst the selectable frame rendering adjustment button 412 is in the unselected state and move with the face three-dimensionally. For example, if instead of looking directly into the camera 208 as shown in FIG. 8, a user turns his head 90 degrees to be side-on to the camera 208, only one of the brushstrokes 801a and 801b will be rendered in the user interface provided by the frame modification application 230 (in dependence on whether the user turns his head clockwise or anti-clockwise).

A drawing is defined by a plurality of drawing instructions. The u,v co-ordinates of each drawing are stored in a queue in the memory 226 whereby the u,v co-ordinates of the most recent drawing are stored at the top of the queue and the the u,v co-ordinates of the oldest drawing are stored at the bottom of the queue.

As shown in FIGS. 4 and 8, the frame modification application 230 may overlay a selectable undo button 414 over the displayed captured video for User A 104 to select using an appropriate input device. In response to detecting selection of the selectable undo button 414 the frame modification application 230 is arranged to remove the u,v co-ordinates at the top of the queue in the memory 226. Thus when step S528 is performed, the latest drawing made by User A 104 is no longer rendered (subsequent video frames received by the frame modification application 230 are not modified with this latest drawing).

As shown in FIGS. 4 and 8, the frame modification application 230 may overlay a selectable new drawing button 416 over the displayed captured video for User A 104 to select using an appropriate input device. In response to detecting selection of the selectable new drawing button 416 the frame modification application 230 is arranged to remove the u,v co-ordinates of all of the drawings stored in the queue in the memory 226. Thus all of the drawings made by User A 104 up to that point in time are no longer rendered by the frame modification application 230.

As shown in FIGS. 4 and 8, the frame modification application 230 may overlay a selectable save button 418 over the displayed captured video for User A 104 to select using an appropriate input device. In response to detecting selection of the selectable save button 418 the frame modification application 230 is arranged to save a drawing file to memory 226. The drawing file that is saved comprises all of the u,v co-ordinates (and their associated effect information) that are stored in memory 226 at the time the save button 418 is selected. Thus, the drawing file is saved in a format that is independent of face shape and the resolution and type of camera 208. This enables saved drawing files to be shared between users of the communication system 100.

Whilst exemplary embodiments have been described above with reference to the scenario whereby the frame modification application 230 receives the captured video frames from the camera 208 of the first user terminal 102, and User A 104 drawing on these captured video frames (drawing instructions received from User A 104), principles of the present disclosure extend to other scenarios.

In another scenario, the captured video (shown in FIG. 3) received by the frame modification application 230 executed on the first user terminal 108 is received over the network 106 from the second user terminal 108 (captured by the camera of the second user terminal 108) and displayed in user interface provided by the frame modification application 230—the drawing instructions (shown in FIG. 3) are received from User A 104 in response to User A 104 drawing on these displayed video frames. Thus in this embodiment, User A 104 draws on User B's face that is displayed on the first user terminal 102 and this drawing is rendered on the display 204 of the first user terminal 102.

Whilst embodiments have been described with reference to drawings being made by a user drawing brushstrokes on frames of incoming live video, embodiments of the present disclosure extend to a drawing instruction comprising the application of pre-computed three-dimensional graphical object to frames of incoming live video. For example a user may select to place a hat graphic onto a face, thus in accordance with embodiments described above the hat graphic will be tied to vertices of the three-dimensional triangulated mesh and thus move three dimensionally as the user (captured in the video) moves.

A first aspect of the present disclosure has been described above.

The step of detecting the condition may comprise detecting a further selection of the selectable button displayed in said user interface.

The step of detecting the condition may comprise detecting that a predetermined period of time has elapsed since selection of the selectable button displayed in said user interface.

Determining a position of a face of a user in the received video frame may comprise identifying facial feature points of said face in two-dimensions and fitting a three-dimensional triangulated mesh to the tracked facial feature points, wherein each drawing input defines image data to be applied at a position on said three-dimensional triangulated mesh.

The step of modifying the displayed video frame may comprise mapping textures of each triangle of the three-dimensional triangulated mesh onto a two-dimensional representation of the three-dimensional triangulated mesh; and for each received drawing input: determining a position in the two-dimensional representation of the three-dimensional triangulated mesh that corresponds to the position on said three-dimensional triangulated mesh applying the image data to the determined position in the two-dimensional representation of the three-dimensional triangulated mesh; and mapping textures of each triangle of the two dimensional representation of the three-dimensional triangulated mesh onto the three-dimensional triangulated mesh.

The step of modifying the displayed video frame may comprise mapping textures of each triangle of the three-dimensional triangulated mesh onto a first two-dimensional representation of the three-dimensional triangulated mesh; and for each received drawing input: determining a position in a second two-dimensional representation of the three-dimensional triangulated mesh that corresponds to the position on said three-dimensional triangulated mesh; applying the image data to the determined position in the second two-dimensional representation of the three-dimensional triangulated mesh; blending the second two-dimensional representation of the three-dimensional triangulated mesh onto the first two-dimensional representation of the three-dimensional triangulated mesh to create a blended two-dimensional representation of the three-dimensional triangulated mesh; and mapping textures of each triangle of the blended two-dimensional representation of the three-dimensional triangulated mesh onto the three-dimensional triangulated mesh.

Determining a position of a face of a user in each video frame received after detecting said condition may comprise identifying facial feature points of said face in two-dimensions and fitting a three-dimensional triangulated mesh to the tracked facial feature points, wherein each drawing input defines image data to be applied at a position on said three-dimensional triangulated mesh.

The step of modifying each video frame received after detecting said condition may comprise mapping textures of each triangle of the three-dimensional triangulated mesh onto a two-dimensional representation of the three-dimensional triangulated mesh; and for each received drawing input: determining a position in the two-dimensional representation of the three-dimensional triangulated mesh that corresponds to the position on said three-dimensional triangulated mesh; applying the image data to the determined position in the two-dimensional representation of the three-dimensional triangulated mesh; and mapping textures of each triangle of the two dimensional representation of the three-dimensional triangulated mesh onto the three-dimensional triangulated mesh.

The step of modifying each video frame received after detecting said condition may comprise mapping textures of each triangle of the three-dimensional triangulated mesh onto a first two-dimensional representation of the three-dimensional triangulated mesh; and for each received drawing input: determining a position in a second two-dimensional representation of the three-dimensional triangulated mesh that corresponds to the position on said three-dimensional triangulated mesh; applying the image data to the determined position in the second two-dimensional representation of the three-dimensional triangulated mesh; blending the second two-dimensional representation of the three-dimensional triangulated mesh onto the first two-dimensional representation of the three-dimensional triangulated mesh to create a blended two-dimensional representation of the three-dimensional triangulated mesh; and mapping textures of each triangle of the blended two-dimensional representation of the three-dimensional triangulated mesh onto the three-dimensional triangulated mesh.

The method may further comprise displaying at least one selectable drawing tool button in the user interface.

The at least one selectable drawing tool button may comprise one or any combination of: a pen drawing tool button, a lipstick drawing tool button, and a brush drawing tool button.

The method may further comprise in response to detecting selection of one of the at least one selectable drawing tool buttons by a user using an input device of said user terminal, displaying a plurality of selectable colours associated with the selected drawing tool button The image data may be based on the selected drawing tool button and a selected colour of the plurality of selectable colours associated with the selected drawing tool button.

The video frames may be received from a camera of said user terminal.

The method may further comprise transmitting each modified video frame over the communications network to the at least one further user terminal.

The method may further comprise preventing video frames received whilst display of video frames is disabled from being transmitted over the communications network to the at least one further user terminal.

The method may further comprise transmitting video frames that are received whilst display of video frames is disabled over the communications network to the at least one further user terminal.

The method may further comprise: as each drawing input is received, transmitting an indication of the drawing input to the at least one further user terminal. Alternatively, the method may further comprise transmitting an indication of the plurality of drawing inputs in response to detecting said condition.

The steps shown separately in FIGS. 5a and 5b may or may not be implemented as separate steps, and may or may not be implemented in the order shown.

Generally, any of the functions described herein can be implemented using software, firmware, hardware (e.g., fixed logic circuitry), or a combination of these implementations. The terms "controller", "functionality", "component", and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented at a user terminal during a video call conducted with at least one further user terminal over a communications network, the method comprising:
   displaying a user interface on a display of the user terminal, the user interface configured to display received video frames;
   detecting selection of a selectable button displayed in the user interface via an input device of the user terminal while displaying, in the user interface, a received video frame;

in response to detecting selection of the selectable button, disabling display of subsequent video frames received after the received video frame;
determining a position of a face in the received video frame by using a face tracker algorithm;
receiving a plurality of drawing inputs while the selectable button is in a selected state, each respective drawing input of the plurality of drawing inputs defining respective image data to be applied at a respective facial position on the face;
modifying the received video frame that is displayed in the user interface in accordance with the plurality of drawing inputs by applying each respective image data to each respective facial position on the face;
detecting a condition;
responsive to detecting the condition, determining, for each respective video frame received after detecting the condition, a respective location for each respective facial position on the face in the respective video frame received after detecting the condition by using the face tracker algorithm;
modifying each respective video frame received after detecting the condition by applying each respective image data to each respective location for each respective facial position on the face to generate a respective modified video frame; and
displaying each respective modified video frame in the user interface.

2. The method of claim 1, wherein detecting the condition comprises detecting a further selection of the selectable button displayed in the user interface.

3. The method of claim 1, wherein detecting the condition comprises detecting that a predetermined period of time has elapsed since selection of the selectable button displayed in the user interface.

4. The method of claim 1, wherein determining the position of the face in the received video frame comprises:
identifying facial feature points of the face in two-dimensions; and
fitting a three-dimensional triangulated mesh to the identified facial feature points, wherein each respective image data comprises data to be applied at a respective position on the three-dimensional triangulated mesh.

5. The method of claim 4, wherein the modifying the received video frame that is displayed in the user interface comprises:
mapping textures of each triangle of the three-dimensional triangulated mesh onto a two-dimensional representation of the three-dimensional triangulated mesh; and
for each respective drawing input:
determining a respective position in the two-dimensional representation of the three-dimensional triangulated mesh that corresponds to the respective position on the three-dimensional triangulated mesh;
applying the respective image data to the respective position in the two-dimensional representation of the three-dimensional triangulated mesh; and
mapping textures of each triangle of the two dimensional representation of the three-dimensional triangulated mesh onto the three-dimensional triangulated mesh.

6. The method of claim 4, wherein the modifying the received video frame that is displayed in the user interface comprises:
mapping textures of each triangle of the three-dimensional triangulated mesh onto a first two-dimensional representation of the three-dimensional triangulated mesh; and
for each respective drawing input:
determining a respective position in a second two-dimensional representation of the three-dimensional triangulated mesh that corresponds to the respective position on the three-dimensional triangulated mesh;
applying the respective image data to the respective position in the second two-dimensional representation of the three-dimensional triangulated mesh;
blending the second two-dimensional representation of the three-dimensional triangulated mesh onto the first two-dimensional representation of the three-dimensional triangulated mesh to create a blended two-dimensional representation of the three-dimensional triangulated mesh; and
mapping textures of each triangle of the blended two-dimensional representation of the three-dimensional triangulated mesh onto the three-dimensional triangulated mesh.

7. The method of claim 1, wherein determining the respective location for the respective facial position on the face in each respective video frame received after detecting the condition comprises:
identifying facial feature points of the face in two-dimensions; and
fitting a three-dimensional triangulated mesh to the identified facial feature points, wherein each respective image data comprises data to be applied at a respective position on the three-dimensional triangulated mesh.

8. The method of claim 7, wherein the modifying each respective video frame received after detecting the condition comprises:
mapping textures of each triangle of the three-dimensional triangulated mesh onto a two-dimensional representation of the three-dimensional triangulated mesh; and
for each respective drawing input:
determining a respective position in the two-dimensional representation of the three-dimensional triangulated mesh that corresponds to the respective position on the three-dimensional triangulated mesh;
applying the respective image data to the respective position in the two-dimensional representation of the three-dimensional triangulated mesh; and
mapping textures of each triangle of the two dimensional representation of the three-dimensional triangulated mesh onto the three-dimensional triangulated mesh.

9. The method of claim 7, wherein the modifying each respective video frame received after detecting the condition comprises:
mapping textures of each triangle of the three-dimensional triangulated mesh onto a first two-dimensional representation of the three-dimensional triangulated mesh; and
for each respective drawing input:
determining a respective position in a second two-dimensional representation of the three-dimensional triangulated mesh that corresponds to the respective position on the three-dimensional triangulated mesh;
applying the respective image data to the respective position in the second two-dimensional representation of the three-dimensional triangulated mesh;

blending the second two-dimensional representation of the three-dimensional triangulated mesh onto the first two-dimensional representation of the three-dimensional triangulated mesh to create a blended two-dimensional representation of the three-dimensional triangulated mesh; and mapping textures of each triangle of the blended two-dimensional representation of the three-dimensional triangulated mesh onto the three-dimensional triangulated mesh.

10. The method of claim 1, wherein the method further comprises displaying at least one selectable drawing tool button in the user interface.

11. The method of claim 10, wherein the at least one selectable drawing tool button comprises one or any combination of: a pen drawing tool button, a lipstick drawing tool button, and a brush drawing tool button.

12. The method of claim 10, wherein the method further comprises:
responsive to detecting selection of one of the at least one selectable drawing tool buttons via the input device of the user terminal, displaying a plurality of selectable colours associated with the selected drawing tool button.

13. The method of claim 12, wherein each respective image data is based, at least in part, on the selected one of the at least one selectable drawing tool buttons and a selected colour of the plurality of selectable colours associated with the selected one of the at least one selectable drawing tool buttons.

14. The method of claim 1, further comprising receiving the received video frames from a camera associated with the user terminal.

15. The method of claim 14, the method further comprising transmitting each respective modified video frame over the communications network to the at least one further user terminal.

16. The method of claim 14, further comprising preventing, while display of the subsequent video frames is disabled, the subsequent video frames from being transmitted over the communications network to the at least one further user terminal.

17. The method of claim 14, further comprising transmitting, while display of the subsequent video frames is disabled, the subsequent video frames over the communications network to the at least one further user terminal.

18. The method of claim 14, further comprising:
as each respective drawing input is received, transmitting an indication of the respective drawing input to the at least one further user terminal; or
transmitting an indication of the plurality of drawing inputs in response to detecting said condition.

19. A user terminal comprising:
a display;
an input device;
a network interface configured to transmit and receive video data between the user terminal and a communication network during a video call between the user terminal and at least one further user terminal; and
a processor configured to run an application operable, during the video call, to:
display a user interface on the display for display of received video frames;
detect selection of a selectable button displayed in the user interface via the input device while a received video frame is displayed in the user interface;
in response to detecting selection of the selectable button, disable display of subsequent video frames received after the received video frame;
determine a position of a face in the received video frame by using a face tracker algorithm;
receive a plurality of drawing inputs while the selectable button is in a selected state, each respective drawing input of the plurality of drawing inputs defining respective image data to be applied at a respective facial position on the face;
modify the received video frame that is displayed on the user interface in accordance with the plurality of drawing inputs by applying each respective image data to each respective facial position on the face;
detect a condition;
responsive to detecting the condition, determine, for each respective video frame received after detecting the condition, a respective location for each respective facial position on the face in the respective video frame received after detecting the condition by applying the face tracker algorithm to determine the respective location of the respective facial position;
modify each respective video frame received after detecting the condition by applying each respective image data to each respective location for each respective facial position on the face to generate a respective modified video frame; and
display each respective modified video frame in the user interface.

20. A computer program product, the computer program product being embodied on one or more computer-readable storage medium devices and configured, responsive to execution on a processor of a user terminal during a video call between the user terminal and at least one further user terminal, to:
display a user interface on a display of the user terminal, the user interface configured to display received video frames;
detect selection of a selectable button displayed in the user interface via an input device of the user terminal while displaying, in the user interface, a received video frame;
in response to detecting selection of the selectable button, disable display of subsequent video frames received after the received video frame;
determine a position of a face in the received video frame by using a face tracker algorithm;
receive a plurality of drawing inputs while the selectable button is in a selected state, each respective drawing input of the plurality of drawing inputs defining respective image data to be applied at a respective facial position on the face;
modify the received video frame that is displayed in the user interface in accordance with the plurality of drawing inputs by applying each respective image data to each respective facial position on the face;
detect a condition;
responsive to detecting the condition, determine, for each respective video frame received after detecting the condition, a respective location for each respective facial position on the face in the respective video frame received after detecting the condition by using the face tracker algorithm;
modify each respective video frame received after detecting the condition by applying each respective image data to each respective location for each respective facial position on the face to generate a respective modified video frame; and display each respective modified video frame in the user interface.

* * * * *